Patented May 23, 1939

2,159,953

UNITED STATES PATENT OFFICE 2,159,953

INSECTICIDE

Giuseppe Proetto, Philadelphia, Pa.

No Drawing. Application March 16, 1939,
Serial No. 262,177

4 Claims. (Cl. 167—24)

This invention relates to an insecticide, and has particular reference to the type of insecticide, which will kill insects, if they are sprayed with same, and will prevent the destruction of flowers, vegetables, fruits, shrubbery and all foliage, when the same are sprayed therewith.

This is a continuation-in-part of my application Serial No. 152,367, filed July 7, 1937.

Various types of insecticides on the market today are designed to prevent the destruction of flowers, shrubbery, etc. by insects when the flowers, etc., are sprayed with same, but these compositions rarely keep all types of insects away from the plant life to be protected, and in many instances these insecticides are harmful to the plants, flowers, fruit, vegetable or foliage. Also many of these insecticides are of a poisonous nature, so that fruits and the like are liable to contamination. The ideal insecticide, therefore, is one which drives insects away from the matter sprayed, or kills them, is not injurious to the flowers, fruit or foliage, and when used as a spray thereon, will repel the attack of all types of insects.

The object of the present invention is to provide an insecticide which will kill all classes of insects sprayed with same.

Another object is to provide an insecticide which will prevent the attack upon flowers, vegetables, fruit and foliage when the same has been sprayed therewith.

A still further object of the invention is to provide an insecticide which will not injure the most delicate flowers, vegetables, fruit, foliage or the like when the same comes in contact therewith.

Another object of the invention is to provide an insecticide which is of a non-poisonous nature to human beings so that fruit, vegetables and the like when sprayed therewith may be rinsed and eaten without fear of poisoning, or any deleterious effects from the insecticide.

Another object of the invention is to provide an insecticide which, in addition to the foregoing objects, will promote the beauty of flowers and fruits, and will enhance the growth of vegetables and foliage of all types.

The invention has as its base, the sediment from the manufacture of wine, commonly known as "wine dregs", and which may be found in the bottoms of casks, barrels, etc. after wine has been aged for a certain period. This is taken in its natural form and introduced into a mixture.

The process of manufacturing will now be explained.

Water to the required amount is introduced into a tank, preferably glass-lined, and to this is added a strong alkali soap. When thoroughly dissolved, capsicum is introduced. This capsicum may be in the form of red or cayenne pepper, or any of the well known ingredients falling within this class. After the capsicum has been thoroughly stirred into the combined soap and water, wine dregs are added and thoroughly stirred into the mixture. To this combination is then added nicotine and cucurbita juice. The cucurbita juice may be procured from the crushing of African bitter gourds (preferably green), and when this juice is thoroughly mixed with the nicotine, the resulting mass is introduced and stirred into the combined water, soap, capsicum and wine dregs. This produces an insecticide, which experiment has proven, will accomplish every object hereinbefore set forth.

It has been learned that the following proportions may be used to procure an insecticide having all the virtues required, but it is to be understood that this formula is illustrative and not intended to act as a limitation or as a specific formula for the ingredients:

| | Pounds |
|---|---|
| Wine dregs | 8 |
| Capsicum | 6 |
| African bitter gourd juice | 8 |
| Nicotine | 8 |
| Strong alkali soap | 6 |
| Water | 764 |

It has also been found that a better dispersion of the ingredients will be obtained if a certain amount of fish oil is introduced into the foregoing mixture. Consequently, in some instances, the formula has been changed as follows:—

| | Pounds |
|---|---|
| Wine dregs | 8 |
| Capsicum | 6 |
| African bitter gourd juice | 8 |
| Nicotine | 8 |
| Strong alkali soap | 6 |
| Fish oil | 4 |
| Water | 760 |

The nicotine in the mixture appears to have a narcotic effect, while the capsicum in combination with the African bitter gourd juice (preferably green) and wine dregs constitute the death-dealing ingredients to insect life.

It has been found that the spraying of fruit, plants and the most delicate flowers with this composition, produces no bad effects on any one of them, and, as a matter of fact, the composition has proven to be an aid to better vegetation.

It has been found that in some instances the nicotine and alkali soap may be omitted, and the resultant mixture will still produce a good insecticide.

This composition will kill grasshoppers, plant lice, caterpillars, Japanese beetles, locusts and all types of vegetable and flower insects when they are sprayed with same, and it will prevent their attack upon flowers, fruit, vegetables and all foliage, when the same has been sprayed therewith.

Various experiments have been conducted in the Department of Agriculture, and different types of insects have been subjected to the influence of this insecticide, and the effects carefully noted. In all instances, where these insects have actually come in contact with the composition itself, death has ensued in a very short space of time.

Experiments on growing flowers, vegetables, shrubbery and the like over a long period of time have proven that not only will the matter sprayed with this composition be free from the attack of insects, but that more luxurious flowers, fruits and vegetation has been the result of this experimentation.

Of course, the composition of matter or insecticide herein described may be modified and changed in various ways without departing from the invention herein set forth and hereafter claimed.

The invention is hereby claimed as follows:—

1. An insecticide comprising wine dregs, capsicum, African bitter gourd juice, nicotine, and strong alkali soap.

2. An insecticide comprising wine dregs, capsicum, African bitter gourd juice, nicotine, fish oil and strong alkali soap.

3. An insecticide comprising ingredients in the following approximate proportions: wine dregs, 8 lbs.; capsicum, 6 lbs.; African bitter gourd juice, 8 lbs.; nicotine, 8 lbs.; strong alkali soap, 6 lbs.; and water.

4. An insecticide comprising ingredients in the following approximate proportions: wine dregs, 8 lbs.; capsicum, 6 lbs.; African bitter gourd juice, 8 lbs.; nicotine, 8 lbs.; strong alkali soap, 6 lbs.; fish oil, 4 lbs.; and water.

GIUSEPPE PROETTO.